United States Patent
Mopur et al.

(10) Patent No.: US 9,021,499 B2
(45) Date of Patent: Apr. 28, 2015

(54) MOVING A LOGICAL DEVICE BETWEEN PROCESSOR MODULES IN RESPONSE TO IDENTIFYING A VARYING LOAD PATTERN

(75) Inventors: Satish Kumar Mopur, Karnataka (IN); Ayman Abouelwafa, Folsom, CA (US); Manasij Nandi, West Bengal (IN); Aswin Jayaraman, Karnataka (IN); Sijesh T. Balakrishnan, Karnataka (IN)

(73) Assignee: Hewlett-Packard Development Company, L.P., Houston, TX (US)

( * ) Notice: Subject to any disclaimer, the term of this patent is extended or adjusted under 35 U.S.C. 154(b) by 379 days.

(21) Appl. No.: 13/346,933

(22) Filed: Jan. 10, 2012

(65) Prior Publication Data
US 2013/0179890 A1 Jul. 11, 2013

(51) Int. Cl.
G06F 9/455 (2006.01)
G06F 9/46 (2006.01)
G06F 9/50 (2006.01)
G06F 3/06 (2006.01)
G06F 11/34 (2006.01)

(52) U.S. Cl.
CPC .......... G06F 9/5083 (2013.01); G06F 3/0613 (2013.01); G06F 3/0635 (2013.01); *G06F 3/0653* (2013.01); G06F 3/0683 (2013.01); G06F 11/3485 (2013.01); G06F 11/3433 (2013.01); *G06F 2201/81* (2013.01)

(58) Field of Classification Search
CPC ..... G06F 9/505; G06F 9/5083; G06F 9/5088; G06F 9/5027
See application file for complete search history.

(56) References Cited

U.S. PATENT DOCUMENTS

| | | | |
|---|---|---|---|
| 6,145,028 A | 11/2000 | Shank | |
| 6,237,063 B1 | 5/2001 | Bachmat | |
| 7,395,388 B2 | 7/2008 | Sugiura | |
| 2002/0004912 A1 | 1/2002 | Fung | |
| 2002/0087291 A1* | 7/2002 | Cooper | 702/186 |
| 2006/0236324 A1* | 10/2006 | Gissel et al. | 718/105 |
| 2008/0115143 A1* | 5/2008 | Shimizu et al. | 718/105 |
| 2009/0049314 A1* | 2/2009 | Taha et al. | 713/300 |
| 2010/0306465 A1 | 12/2010 | Shimozono | |
| 2011/0072208 A1 | 3/2011 | Gulati et al. | |
| 2012/0079480 A1* | 3/2012 | Liu | 718/1 |
| 2012/0166644 A1* | 6/2012 | Liu et al. | 709/226 |
| 2012/0192200 A1* | 7/2012 | Rao et al. | 718/105 |
| 2013/0055283 A1* | 2/2013 | Mopur et al. | 718/104 |
| 2013/0061220 A1* | 3/2013 | Gnanasambandam et al. | 718/1 |

FOREIGN PATENT DOCUMENTS

JP   6131125   5/1994

OTHER PUBLICATIONS

Wang et al., "Impact of DVFS on n-Tier Application Performance". Nov. 2013.*
Muppala, "Multi-Tier Internet Service Management: Statistical Learning Approaches", 1992.*

(Continued)

*Primary Examiner* — Meng An
*Assistant Examiner* — Bradley Teets
(74) *Attorney, Agent, or Firm* — Trop, Pruner & Hu, P.C.

(57) ABSTRACT

Utilization of the processor modules is monitored. A varying load pattern including at least one of a bursty behavior or an oscillatory behavior of the processor modules is identified. Distribution of logical devices between processor modules is performed.

13 Claims, 6 Drawing Sheets

(56) References Cited

OTHER PUBLICATIONS

Gmach et al., "Resource Pool Management: Reactive versus proactive or let's be friends", Aug. 20, 2009.*
Singh et al., "Server-Storage Virtualization: Integration and Load Balancing in Data Centers".*
Perez-Palacim et al., "Analysis of Bursty Workload-aware Self-adaptive Systems", Apr. 2012.*
Ali-Eldin et al., "Efficient Provisioning of Bursty Scientific Workloads on the Cloud Using Adaptive Elasticity Control", Jun. 2012.*
Ali-Eldin et al., "Workload Classification for Efficient Auto-Scaling of Cloud Resources", May 2013.*
Nutall et al., "Workload Characteristics for Process Migration and Load Balancing", 1997.*
Guo et al., "Cost-aware Cloud Bursting for Enterprise Applications".*
Wood et al., "CloudNet: Dynamic Pooling of Cloud Resources by Live WAN Migration of Virtual Machines", Mar. 2011.*
Tai et al., "Live Data Migration Fro Reducing SLA Violations in Multi-tiered Storage Systems".*
Bruce Simmons, www.mathwords.com, Area Under a Curve, Mar. 2011 (2 pages).
Uttamchandani et al., Chameleon: a self-evolving, fully-adaptive resource arbitrator for storage systems, 2005 (14 pages).
EMC, White Paper, Maintaining Service Levels for VMware ESX Using Navisphere QoS Manager for EMC Celerra Unified Storage Platforms—Applied Technology, Mar. 2009 (23 pages).
Gulati, et al., Modeling Workloads and Devices for IO Load Balancing in Virtualized Environments, Dec. 2009 (8 pages).
Lee et al., Regulating I/O Performance of Shared Storage with a Control Theoretical Approach, 2004 (13 pages).
Alvarez et al., Hewlett-Packard Laboratories, ACM Transactions on Computer Systems, vol. 19, No. 4, Nov. 2001, Minerva: An Automated Resource Provisioning Tool for Large-Scale Storage Systems (36 pages).
Pillar Data Systems, White Paper, Managing Quality of Service (QoS) in a Shared Storage Environment, Apr. 2010 (9 pages).

* cited by examiner

MOVING A LOGICAL DEVICE BETWEEN PROCESSOR MODULES IN RESPONSE TO IDENTIFYING A VARYING LOAD PATTERN

BACKGROUND

An enterprise can employ a data center that has a shared infrastructure including processor modules in the shared infrastructure for handling workloads from various requestors. Examples of requestors can include applications running on client machines, such as servers, host computers, and so forth. In a shared infrastructure with storage devices, uneven storage input/output (I/O) workloads may be experienced by the storage processor modules, with some processor modules handling larger workloads than other processor modules.

BRIEF DESCRIPTION OF THE DRAWINGS

Some embodiments are described with respect to the following figures.

DETAILED DESCRIPTION

Resources of a shared infrastructure can be allocated to requestors on demand for performing requested workloads. In some examples, the shared infrastructure can include a storage system that has processor modules for handling input/output (I/O) requests, such as data read or write requests. In response to an I/O request, a processor module can perform a corresponding operation (e.g. read operation, write operation, etc.) with respect to storage associated with the processor module. In some examples, a storage device can include a storage array that has an array of storage units and associated processor modules. In other examples, a storage device can include a stand-alone storage unit, such as a hard disk drive, integrated circuit storage device, associated processor module(s), and so forth.

In the ensuing discussion, reference is made to a shared infrastructure that has a shared storage system for processing I/O requests from requestors. It is noted that in further examples, the shared infrastructure can additionally or alternatively include a processing system for providing processing services (e.g. providing processor cycles to execute applications, etc.), and/or a communications system for providing communications services (e.g. routing services, network services, etc.). Techniques or mechanisms according to various implementations can also be applied for such other type of shared infrastructure.

Resources of the shared storage system can be allocated on demand to provide enhanced flexibility and usage of the resources of the storage system. However, such sharing can result in uneven I/O processing across workloads (where the workload of one requestor is associated with better performance than the workload of another requestor), and/or unbalanced resource utilization (where some resources of the storage system are more heavily loaded than other resources of the storage system).

In some implementations, the resources of the storage system can include processor modules, where each processor module is used to perform I/O processing. In some examples, a processor module can include multiple processors (e.g. a multi-core processor with multiple cores, multiple discrete microprocessors, etc.). Uneven I/O processing across workloads and/or unbalanced utilization of the processor modules can result in sub-optimal performance of the overall storage system. Moreover, target performance goals of requestors may not be met in such cases. Some requestors may be considered mission-critical applications, which are applications associated with target performance goals that should be met to ensure that an overall goal of an enterprise (e.g. business concern, educational organization, government agency, individual, etc.) is satisfied.

In some implementations, a processor module can be associated with logical devices. A logical device can refer to an entity representing a logical storage volume with a certain storage capacity to which I/O from a particular workload or group of workloads is targeted, and where the logical storage volume is able to store data of the particular workload or group of workloads. In the context of the storage system, such logical devices are associated with one or more processor modules that perform I/O processing such as data read processing, data write processing, or any other storage-related I/O processing. An I/O request that is targeted to a particular logical device by a workload is scheduled to the associated processor module for processing and dispatching.

In a storage system, workloads with varying I/O intensity to logical devices can result in some processor modules being more heavily loaded than other processor modules. For example, the logical devices associated with a first processor module may be experiencing relatively high I/O load (which causes heavier loading at the first processor module), while the logical devices associated with a second processor module may be relatively lightly loaded (which causes lighter loading at the second processor module). This can result in uneven load distribution across the processor modules or some requestors being provided with a higher performance level than other requestors.

In accordance with some implementations, a dynamic load distribution system is provided to reduce overloading on certain processor modules in situations where there are other processor modules that have sufficient processing power. In other words, the dynamic load distribution system is able to perform load balancing of workloads across the processor modules. As discussed in detail further below, the load balancing of workloads is accomplished by distributing (and re-distributing) logical devices across the processor modules.

Additionally, in distributing (and re-distributing) logical devices across processor modules, the dynamic load distribution system also considers applicable target performance goals of requestors. A target performance goal can be in the form of a service level objective (SLO) associated with a particular requestor. Examples of an SLO include a target deadline in terms of latency to perform a specific I/O processing, a target utilization of resources for the specific I/O processing, and so forth. More generally, a target performance goal is a goal that relates to distributing load across processor modules. The dynamic load distribution system seeks to avoid or reduce the likelihood that the target performance goal of a requestor is violated.

Figure 1:
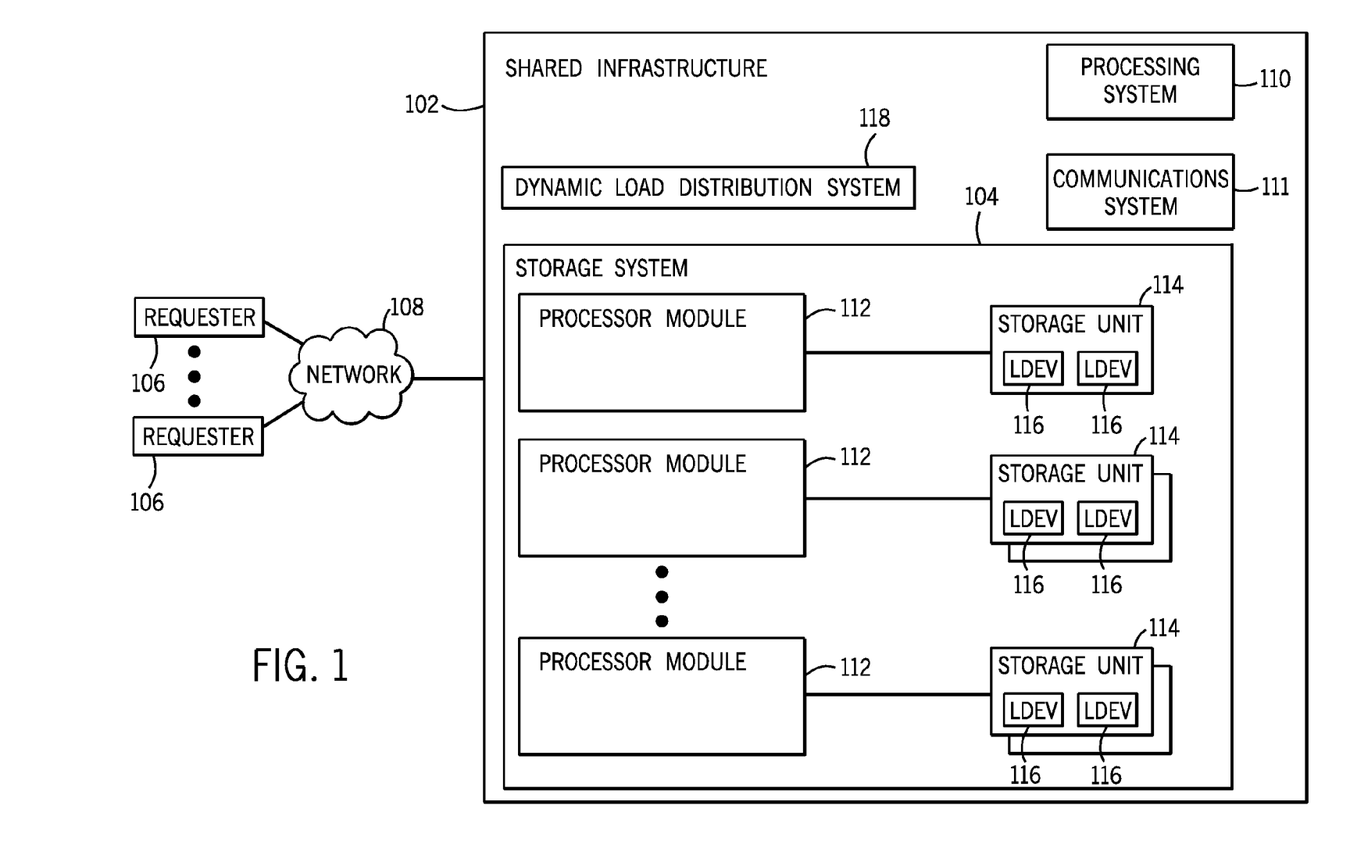
FIG. 1 is a block diagram of an arrangement including a shared infrastructure according to some implementations.

FIG. 1 illustrates an example shared infrastructure 102 that has a storage system 104 that has resources that can be shared by various requestors, such as requestors 106 coupled over a network 108 to the shared infrastructure 102. In some examples, the shared infrastructure 102 can also include a shared processing system 110 having processing resources that are shared by the requestors 106, and/or a shared communications system 111 having communications resources that are shared by the requestors 106.

In the ensuing discussion, reference is made to sharing of the storage resources in the storage system 104. Note that techniques or mechanisms according to some implementations can also be applied to the processing system 110, the communications system 111, or to any other type of system having resources that can be shared by multiple requestors.

The storage system 104 includes processor modules 112, where each processor module 112 manages I/O workloads requested by requestors 106. Each processor module 112 is attached to respective storage unit(s) 114 (where a storage unit can include a disk-based storage unit, an integrated circuit storage unit, and so forth). An I/O workload handled by the processor module 112 can involve I/O operations (e.g. read operations, write operations, etc.) involving the respective storage unit(s) 114. In some examples, a processor module 112 can manage a respective array of storage units 114. In other examples, a processor module 112 can manage a corresponding individual storage unit 114.

Each of the processor modules 112 is associated with one or multiple logical devices (LDEV) 116, which are logical volumes of the storage units, where each logical volume has a respective storage capacity. An I/O request submitted by a requestor 106 can be directed to a particular logical device 116. Such a request would be routed to the processor module 112 associated with the target logical device. Such routing can be performed by the dynamic load distribution system 118. The particular logical device 116 would then receive the I/O operations associated with the request.

Figure 2:
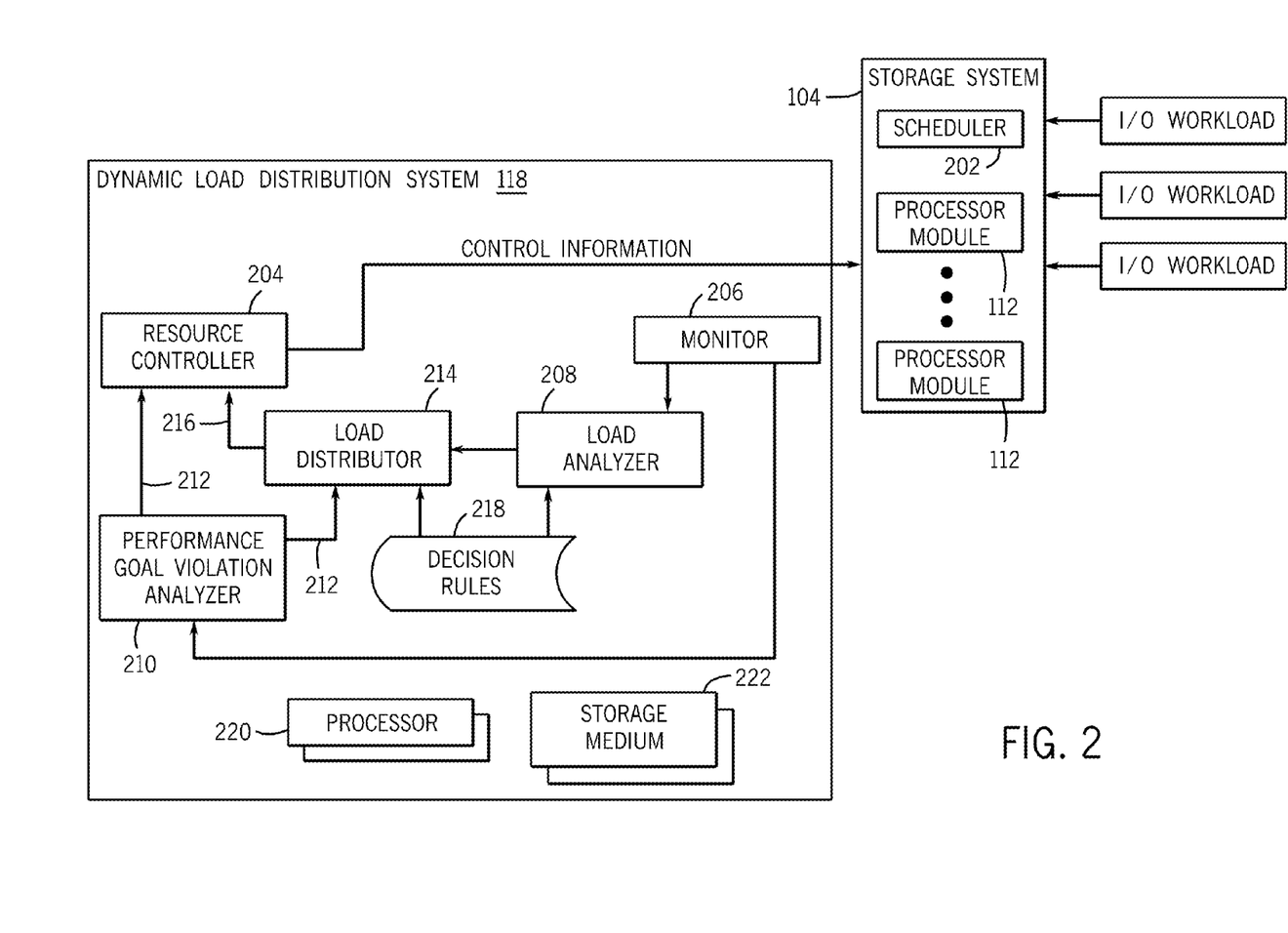
FIG. 2 is a block diagram of a dynamic load distribution system, in accordance with some implementations.

Example components of the dynamic load distribution system 118 are shown in FIG. 2. I/O operations associated with requests from requestors 106 are provided to the storage system 104. The I/O operations can be stored in queues, where the I/O operations remain until they are scheduled for execution by a scheduler 202 in the storage system 104. The scheduler 202 is responsible for scheduling I/O to be performed by the storage system 104, using the processor modules 112 and the logical devices 116 associated with processor modules 112 discussed above. Each I/O operation depicted in FIG. 2 can include the workload associated with one or multiple requests from one or multiple requestors.

The scheduler 202 receives control information from a resource controller 204 in the dynamic load distribution system 118. This control information can include indications of how workloads are to be distributed across the processor modules 112 of the storage system 104. Based on the control information, the scheduler 202 can schedule I/O processing tasks to be performed at corresponding logical devices 116. For example, the control information can indicate that certain I/O workloads can be directed to processor modules and associated logical devices.

In addition to scheduling pending I/O workloads, the dynamic load distribution system 118 can also perform redistribution of logical devices 116 to more evenly balance workloads across the processor modules 112. Such re-distribution of logical devices can be performed by the resource controller 204 in some examples. Re-distributing a particular logical device 116 across processor modules 112 refers to moving the particular logical device 116 from a storage unit 114 (FIG. 1) associated with a first processor module 112 to a storage unit 114 associated with a second processor module 112.

Information regarding target performance goals (such as in the form of SLOs) associated with respective requestors can be provided to the resource controller 204 and to a performance goal violation analyzer 210.

A monitor 206 in the dynamic load distribution system 118 monitors the I/O load to logical devices 116 running in processor modules 112 of the storage system 104. Indications of the monitored loads are provided by the monitor 206 to a load analyzer 208, which determines whether uneven loading of processor modules 112 is present in the storage system 104. Indications of the monitored loads are also provided by the monitor 206 to the performance goal violation analyzer 210 to identify any violations of performance goals. Indications (212) of any violations can be provided to a load distributor 214 and to the resource controller 204.

The load distributor 214 also receives analysis results from the load analyzer 208. Based on the information received from the load analyzer 208 and the performance goal violation analyzer 210, the load distributor 214 is able to determine whether re-distribution of logical devices 116 across processor modules in the storage system 104 is to be performed. Information (216) relating to re-distribution of logical devices can be provided by the load distributor 214 to the resource controller 204. Based on the logical device re-distribution information (216), the resource controller 204 can take action to perform logical device re-distribution, either by sending corresponding re-distribution commands to the storage system 104 or to the scheduler 202.

The load analyzer 208 and load distributor 214 also has access to decision rules 218 that specify rules to be applied during assessment and logical device distribution phases (discussed further below) performed to determine whether logical device re-distribution is to be performed.

The various modules (204, 206, 208, 210, and 214) of the dynamic load distribution system 118 shown in FIG. 2 can be implemented as machine-readable instructions that can be executed on one or multiple processors 220, which are coupled to one or multiple storage media 222. The dynamic load distribution system 118 can be implemented as a single computer system, or in a distributed arrangement of multiple computer systems.

Figure 3:
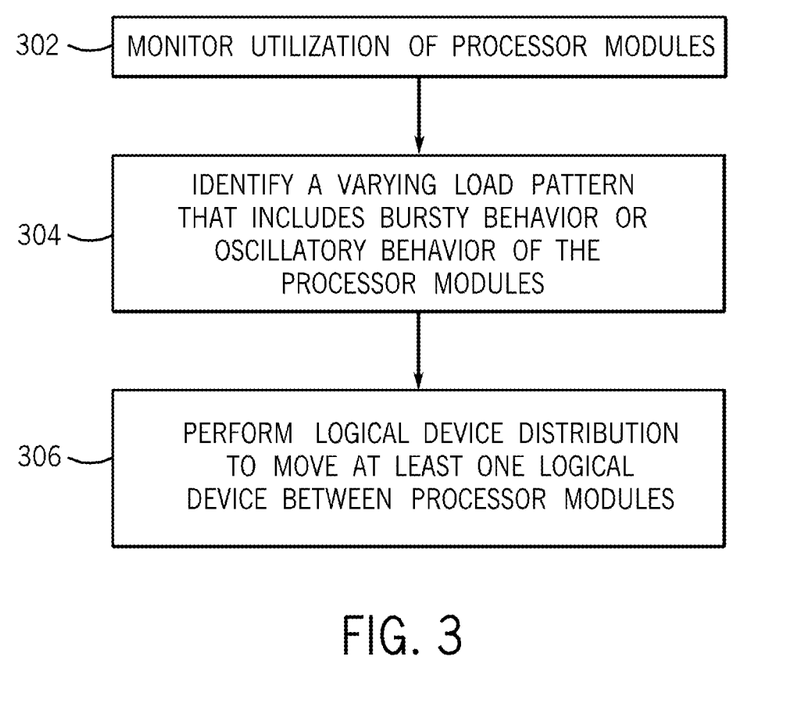
FIGS. 3-6 are flow diagrams of processes according to various implementations.

FIG. 3 is a flow diagram of a process according to some implementations that can be performed by the dynamic load distribution system 118. The process includes monitoring (at 302) utilization of the processor modules 112 that are associated with respective logical devices 116. The process further identifies (at 304) a varying load pattern that includes bursty behavior and/or oscillatory behavior of the load on the processor modules 112. A "varying load pattern" can refer to a pattern of load on processor modules that varies over time. Oscillatory behavior is a type of varying load pattern, and can refer to a load pattern of a processor module that exhibits periodic instances of increased load and reduced load. An example of oscillatory behavior includes a daily periodic load pattern in which relatively high load exists during work hours, but reduced loading is present during non-work hours. The periodicity of this oscillatory behavior is, for example, one day (or 24 hours). There are other examples of oscillatory behavior of load on a processor module.

A bursty behavior refers to a load pattern in a processor module that exhibits intermittent bursts of increased workload—no specific periodicity is associated with bursty behavior. A burst of increased workload can be due to various factors, such as launch of a new application, deployment of additional machines with requestors, and so forth.

In response to identifying a varying load pattern of the processor modules as well as the monitored utilization, the process performs (at 306) logical device distribution in which at least one of the logical devices is moved across different processor modules to meet a target performance goal. Moving a logical device from a first processor module to a second processor module involves moving the I/O processing functionality of subsequent I/O operations on the associated logical device from the first processor module to the second processor module.

Figure 4:
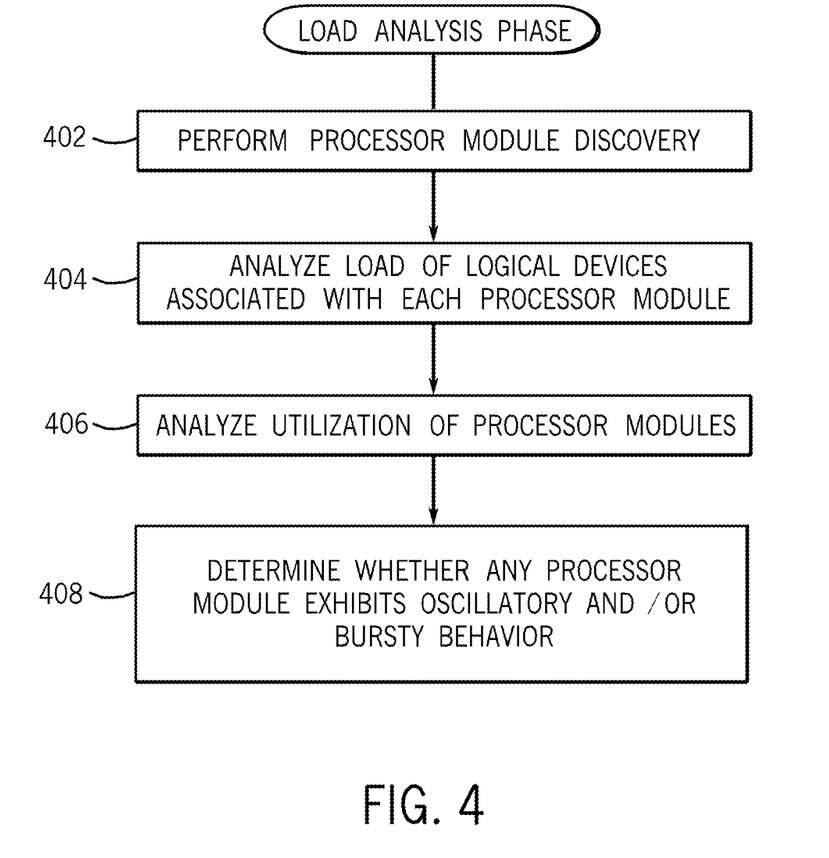

FIG. 4 is a flow diagram of a load analysis phase according to some examples, which can be performed by the load analyzer 208 of FIG. 2. The load analyzer 208 first performs (at 402) processor module discovery, in which the load analyzer 208 obtains identifiers of the processor modules 112 in the storage system 104, along with identifiers of the logical devices 116 associated with corresponding processor modules.

Next, the load analyzer 208 analyzes (at 404) the load of logical devices 116 associated with each processor module 112. The load of the logical devices 116 is based on statistics collected by the monitor 206 of FIG. 2. In some examples, the periodicity (p), if present, of the load pattern of the logical devices 116 in a particular processor module 112 is determined based on the analysis at 404. In some cases, particularly when a given processor module has a relatively large number of logical devices, instead of analyzing statistics associated with all the logical devices of the given processor module, statistics can be analyzed for just a subset of the logical devices of the processor module, such as the n (n>1) busiest logical devices.

The load analyzer 208 also analyzes (at 406) the utilization of each processor module—the utilization of a processor module can be represented as a utilization value, MPB_U, in some examples. The "utilization value" of a processor module refers to a measure of the amount of resource of the processor module, such as processing power, that is being consumed in processing workloads—for example, the utilization value can refer to a percentage of resource consumed, such as an aggregate amount of processor cycles consumed, and so forth. The analyzed utilization can be associated with timestamps, such that utilization at different times can be analyzed. As part of the analysis at 406, the load analyzer 208 can determine if any of the utilization values of a processor module 112 exceeds a predefined utilization threshold (e.g. MPB_Uth).

In some examples, an area-under-curve analysis can be performed over multiple samples of utilization values. The area-under-curve analysis involves determining a curve that corresponds to the utilization value samples, and then determining an area under the curve. The obtained area under the curve is normalized across the number of samples and then compared with the predefined threshold value (e.g. MPB_Uth) to determine if the processor module should be considered to be excessively loaded.

The analysis at 406 allows the load analyzer 208 to identify those processor modules that are overloaded (associated with utilization MPB_U that exceeds the predefined utilization threshold MPB_Uth). The load analyzer 208 can also record how much the utilization is over the predefined utilization threshold.

The load analyzer 208 also determines (at 408) whether any processor module has a varying load pattern including an oscillatory behavior and/or bursty behavior. For example, regression analysis can be performed, in which the trend of utilization values for a given processor module 112 can be analyzed over time. Regression analysis is a statistical technique to trend and analyze data over a period of time. In other examples, other types of techniques can be used for detection of oscillatory or bursty behavior.

Regression analysis produces error residuals that reflect differences between actual and predicted utilization values. These error residuals can be used to assess or detect oscillatory and/or bursty behavior. In some examples, a relatively rapid rise in error residual values can be indicative of a burst while data trending using regression analysis (this indicates presence of bursty behavior). On the other hand, error residual values toggling about a reference value is indicative of oscillatory behavior.

If the load analyzer 208 determines (at 408) that a given processor module exhibits oscillatory and/or bursty behavior, then the load analyzer 208 can record an indication that the given processor module is associated with a bursty behavior and/or an oscillatory behavior.

Figure 5:
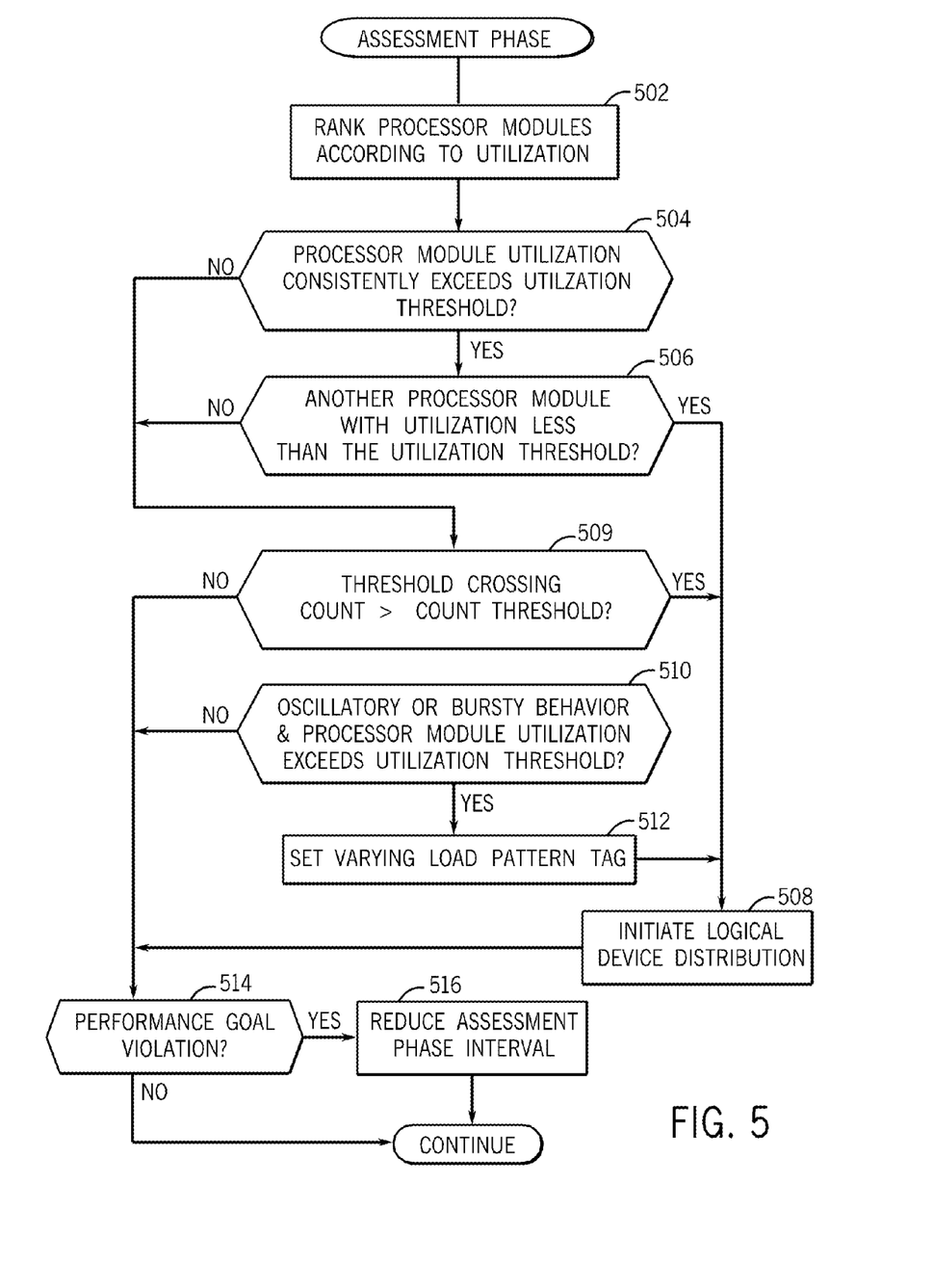

FIG. 5 is a flow diagram of an assessment phase according to some implementations, which can be performed by the load analyzer 208. In alternative implementations, the assessment phase can be performed by the load distributor 210.

The assessment phase of FIG. 5 performed for each processor module can identify predefined conditions, and in response to such predefined conditions, the assessment phase can initiate a logical device distribution phase. The predefined conditions that can trigger logical device distribution are discussed further below.

In some implementations, the assessment phase of FIG. 5 includes ranking (at 502) the processor modules according to their utilization values. For example, the processor module associated with the highest utilization value can be ranked first, while the processor module associated with the lowest utilization value can be ranked last. This ranking can be used to determine the order in which processor modules are to be assessed for determining whether logical device distribution is to be performed; such ranking can also be used to identify a target processor module to which logical device(s) is to be moved.

For each processor module, the process checks (at 504) if the processor module utilization consistently exceeds a predefined utilization threshold. In some examples, processor module utilization is considered to consistently exceed a predefined utilization threshold (MPB_Uth) if the corresponding utilization value (MPB_U) is greater than MPB_Uth, and the time duration of this condition (MPB_U>MPB_Uth) is greater than a predefined time threshold (e.g. MPB_UD). If the foregoing (MPB_U>MPB_Uth and time duration>MPB_UD) is true, the assessment phase next checks (at 506) if there is another processor module that has a utilization (MPB_U) that is less than the threshold (MPB_Uth). If so, then logical device distribution is initiated (at 508). If either of the conditions checked at 504 and 506 is not true, then logical device distribution is not performed.

The assessment phase also checks (at 509) to determine a count of the number of times that the processor module utilization has crossed the predefined utilization threshold. This count can be represented as a value Crossing_Count, which is incremented each time the utilization value (MPB_U) of the processor module exceeds the threshold (MPB_Uth). If it is determined that Crossing_Count is greater than the predefined count threshold (Count_Threshold) over some predefined time interval, then logical device distribution is initiated (at 508).

If Crossing_Count is not greater than Count_Threshold, as determined at 509, then logical device distribution is not initiated.

In addition, the assessment phase also checks (at 510) whether a processor module exhibits oscillatory or bursty behavior, and whether the processor module utilization (MPB_U) of this processor module exceeds the predefined utilization threshold (MPB_Uth). If so, this processor module is associated (at 512) with a varying load pattern tag that is set to a value indicating bursty and/or oscillatory behavior. The varying load pattern tag can be any indicator that when set to a first value indicates that the given processor module exhibits an oscillatory and/or bursty behavior, and when set to a second, different value indicates that the given processor module does not have an oscillatory and/or bursty behavior. In other examples, the varying load pattern tag can have one value to indicate bursty behavior, another value to indicate oscillatory behavior, and yet a further value to indicate that the processor modules does not exhibit either bursty or oscillatory behavior After setting the varying load pattern tag (at 512), the assessment phase next initiates (at 508) logical device distribution. Note that logical device distribution is not initiated if the condition checked for at 510 is not true.

In an environment where target performance goal(s) is (are) associated with requestor(s), the assessment phase also checks (at 514) for performance goal violations pertaining to the each processor module being monitored. In response to detecting a performance goal violation, the time interval for performing the assessment phase depicted in FIG. 5 is reduced (at 516). The assessment phase of FIG. 5 is repeated every specified time interval—initially, this specified time interval can be set to an initial value. However, the time interval can be reduced in response to a detected performance goal violation, such that the assessment phase can be performed more frequently.

Figure 6:
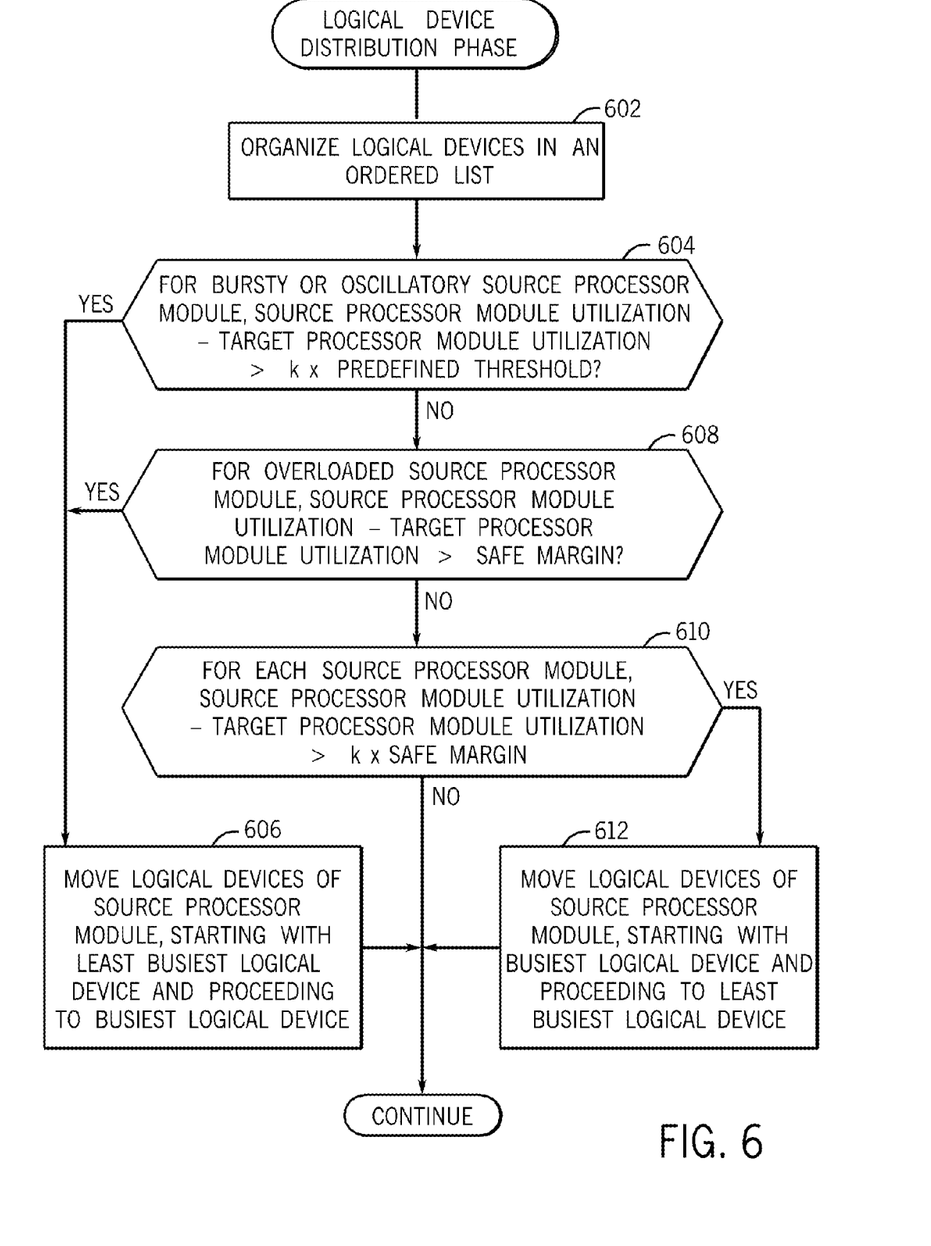

FIG. 6 illustrates the logical device distribution phase (initiated at 508 in FIG. 5) for performing load balancing according to some implementations. The FIG. 6 process can be performed by the load distributor 214 of FIG. 2. The process organizes (at 602) the logical devices 116 of each processor module in a respective ordered list, which lists the logical devices of the corresponding processor module in order of utilization. The logical devices that are candidates for moving to a different processor module are those that are considered most busy or least busy depending on the difference in utilization between a source and target processor module.

The process first identifies (at 604) target processor modules that are not in an overloaded condition and that have respective varying load pattern tags set to values indicating that the processor modules do not exhibit bursty or oscillatory behavior. These identified target processor modules are those that can be candidates as destinations for movement of logical devices from source processor modules.

For each source processor module with a varying load pattern tag set to a value indicating bursty or oscillatory behavior, the process of FIG. 6 determines (at 604) whether the source processor module utilization is greater than the target processor module utilization by greater than k times a predefined threshold. The value of k is a tunable constant (which can be set by a user or a controller). The value of the predefined threshold is also tunable.

If the determination at 604 evaluates to true, then distribution of logical device(s) of the source processor module to the target processor module is performed (at 606). Logical device movement can start with the least busiest logical device of the source processor module (as identified at 602) and proceeding to the busiest logical device. The number of logical devices of the source processor module that are moved is such that the difference between the resulting utilization value of the source processor module (after moving the logical devices) and the resulting utilization of the target processor module (after moving the logical devices) is below MPB_Uth. Also, in some examples, a predefined parameter, $LDEV_C$, can be defined that represents the maximum number of logical devices and can be moved from a source processor module at any one time. Thus the number of logical devices moved from the source processor module to the target processor module should satisfy the foregoing conditions.

The determination at 604 and logical device moving at 606 can be iteratively performed for multiple target processor modules, such that logical devices of the source processor module that satisfies the condition checked for at 604 can be moved to multiple target processor modules.

If the determination at 604 evaluates to false, then the process continues.

The process of FIG. 6 also determines (at 608), for each overloaded source processor module (a source processor module whose utilization value is greater than the predefined utilization threshold), whether the source processor module utilization exceeds the target processor module utilization by greater than the safe margin (which is a predefined margin between utilizations of the source and target processor modules that is to be present before logical device movement between the source and target processor modules can occur). If the determination at 608 evaluates to true, then distribution of logical device(s) of the source processor module to the target processor module is performed wherein the logical device movement can start with the least busiest logical device of the source processor module (as identified at 602) and proceed to the busiest logical device (at 606), as discussed above.

If the determination at 608 evaluates to false, then the process continues.

The condition checked at 604 is for a source processor module with a varying load pattern tag set to a value indicating bursty or oscillatory behavior, and the condition checked at 608 is for an overloaded source processor module.

The process of FIG. 6 also checks (at 610) the following condition for each source processor module without a bursty tag: the source processor module utilization exceeds the target processor module utilization by greater than k multiplied by the safe margin. As noted above, k is a tunable constant.

If the condition checked for at 610 evaluates to true, then distribution of logical device(s) of the source processor module to the target processor module is performed, where logical device movement can start with the busiest logical device of the source processor module (as identified at 602) and proceeding to the least busiest logical device (at 606), as discussed above.

If the determination at 610 evaluates to false, then the process continues.

As noted above, the various modules depicted in FIG. 2 can be implemented with machine-readable instructions that are executable on a processor or multiple processors (e.g. 220 in FIG. 2). A processor can include a microprocessor, microcontroller, processor module or subsystem, programmable integrated circuit, programmable gate array, or another control or computing device.

Data and instructions can be stored in respective storage devices, which are implemented as one or more computer-readable or machine-readable storage media. The storage media include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; optical media such as compact disks (CDs) or digital video disks (DVDs); or other types of storage devices. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the foregoing description, numerous details are set forth to provide an understanding of the subject disclosed herein. However, implementations may be practiced without some or all of these details. Other implementations may include modifications and variations from the details discussed above. It is intended that the appended claims cover such modifications and variations.

What is claimed is:

1. A method of a system having processor modules, comprising:
    monitoring utilization of the processor modules that are associated with respective logical devices to determine whether uneven utilization across the processor modules is present, the logical devices representing logical storage volumes, and the processor modules performing input/output processing for the respective logical devices in response to input/output requests;
    identifying a varying load pattern including at least one of a bursty behavior or an oscillatory behavior of the processor modules; and
    in response to the identifying and the monitored utilization, triggering logical device distribution in which at least one of the logical devices is moved from a first of the processor modules to a second of the processor modules to meet a target performance goal, wherein the logical device distribution is triggered in response to any one of the following:
        the utilization of the first processor module exceeds a predefined utilization threshold and a time duration associated with the utilization of the first processor module exceeding the predefined utilization threshold exceeds a predefined time threshold, or
        a number of times the utilization of the first processor module has exceeded the predefined utilization threshold exceeds a predefined count threshold.

2. The method of claim 1, wherein identifying the bursty behavior of a given processor module comprises identifying an intermittent burst of increased workload.

3. The method of claim 1, wherein identifying the oscillatory behavior of a given processor module comprises identifying a pattern of workload that varies between increased workload and reduced workload on a periodic basis, and wherein the logical device distribution is performed in response to the identifying of the oscillatory behavior of the given processor module.

4. The method of claim 1, wherein the identifying is performed in an assessment phase that is repeated after each predefined time interval, the method further comprising:
    detecting violation of the performance goal in at least one of the processor modules; and
    shortening the predefined time interval in response to the detected violation.

5. The method of claim 1, further comprising:
    receiving a specification of a predetermined maximum number of logical devices that can be moved in a given logical device distribution phase,
    wherein performing the logical device distribution is according to the predetermined maximum number, and the logical device distribution includes selecting logical devices for distribution from busiest logical device to least busiest logical device, or from least busiest logical device to busiest logical device, based on a difference between source and target processor module utilizations.

6. The method of claim 1, further comprising:
    selecting one of the processor modules that does not exhibit a bursty behavior or oscillatory behavior as the second processor module.

7. The method of claim 1, wherein the identifying identifies the first processor module as having the oscillatory behavior or bursty behavior, the method further comprising:
    determining if the utilization of the first processor module exceeds a utilization of the second processor module by greater than a predefined threshold,
    wherein the logical device distribution is performed further in response to the determining.

8. The method of claim 1, wherein performing the logical device distribution includes moving the at least one logical device that performs storage-related input/output processing.

9. An article comprising at least one non-transitory machine-readable storage medium storing instructions that upon execution cause a system to:
    monitor utilization of the processor modules to determine whether a predefined utilization threshold is exceeded;
    identify a varying load pattern including an oscillatory behavior of the processor modules, wherein the identifying comprises identifying a pattern of workload of a first of the processor modules that varies between increased workload and reduced workload on a periodic basis;
    determine if the utilization of the first processor module exceeds a predefined utilization threshold during a time duration that exceeds a predefined time threshold; and
    in response to the monitoring, the identifying, and the determining, trigger distribution of at least one logical device from the first processor module to a second of the processor modules to achieve a target performance goal, the at least one logical device representing a logical storage volume, and the second processor module to, after the distribution, perform input/output processing for the at least one logical device in response to an input/output request.

10. The article of claim 9, wherein triggering the distribution comprises triggering the distribution of plural logical devices from the first processor module to plural other processor modules including the second processor module.

11. The article of claim 9, wherein the distribution of the at least one logical device comprises distribution of plural logical devices from the first processor module, and wherein the distribution is performed in response to a determination that a difference between a resulting utilization of the first processor module after the distribution and a resulting utilization of the second processor module after the distribution is less than the predefined utilization threshold.

12. The article of claim 9, wherein the instructions upon execution cause the system to analyze utilization values of the processor modules to determine if any of the processor modules exhibits the oscillatory behavior.

13. A load distribution system comprising:
    at least one processor to:
        monitor utilization of processor modules to determine whether a predefined utilization threshold is exceeded;
        identify a varying load pattern including an oscillatory behavior of the processor modules, wherein the identifying comprises identifying a pattern of workload of a first of the processor modules that varies between increased workload and reduced workload on a periodic basis;

determine if the utilization of the first processor module exceeds a predefined utilization threshold during a time duration that exceeds a predefined time threshold; and in response to the monitoring, the identifying, and the determining, trigger distribution of at least one logical device from the first processor module to a second of the processor modules to achieve a target performance goal, the at least one logical device representing a logical storage volume, and the second processor module to, after the distribution, perform input/output processing for the at least one logical device in response to an input/output request.

* * * * *